United States Patent
Watanabe

(10) Patent No.: US 10,664,207 B2
(45) Date of Patent: May 26, 2020

(54) CONTROL DEVICE, SERVER COMPRISING CONTROL DEVICE AND NON-TRANSITORY COMPUTER-READABLE MEDIUM TO EXECUTE RELATED PROCESS RELATED TO PRINT BY USING FIRST AND SECOND THRESHOLDS

(71) Applicant: BROTHER KOGYO KABUSHIKI KAISHA, Nagoya-shi, Aichi (JP)

(72) Inventor: Satoshi Watanabe, Nagoya (JP)

(73) Assignee: Brother Kobyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/391,523

(22) Filed: Apr. 23, 2019

(65) Prior Publication Data
US 2019/0332335 A1   Oct. 31, 2019

(30) Foreign Application Priority Data
Apr. 26, 2018 (JP) .................................. 2018-085636

(51) Int. Cl.
*G06F 3/12* (2006.01)
(52) U.S. Cl.
CPC .......... *G06F 3/1219* (2013.01); *G06F 3/1231* (2013.01); *G06F 3/1235* (2013.01); *G06F 3/1239* (2013.01); *G06F 3/1256* (2013.01)

(58) Field of Classification Search
None
See application file for complete search history.

(56) References Cited

U.S. PATENT DOCUMENTS

2018/0088880 A1\*   3/2018   Tanaka ................. G06F 3/1219

FOREIGN PATENT DOCUMENTS

| JP | 2007-299265 A | 11/2007 |
|----|---------------|---------|
| JP | 2011-237858 A | 11/2011 |

\* cited by examiner

*Primary Examiner* — Benny Q Tieu
*Assistant Examiner* — Haris Sabah
(74) *Attorney, Agent, or Firm* — Scully, Scott, Murphy & Presser, PC

(57) ABSTRACT

A control device may every time a first related value is obtained with a first period, execute comparing a second related value and a first threshold; repeatedly obtain the first related value with a second period being shorter than the first period in a case where it is determined that the print amount being related to the second related value is larger than the print amount being related to the first threshold; every time the first related value is obtained with the second period, execute comparing the second related value and a second threshold; and execute a related process that is related to print executed by the print executing unit in a case where it is determined that the print amount being related to the second related value is larger than the print amount being related to the second threshold.

20 Claims, 6 Drawing Sheets

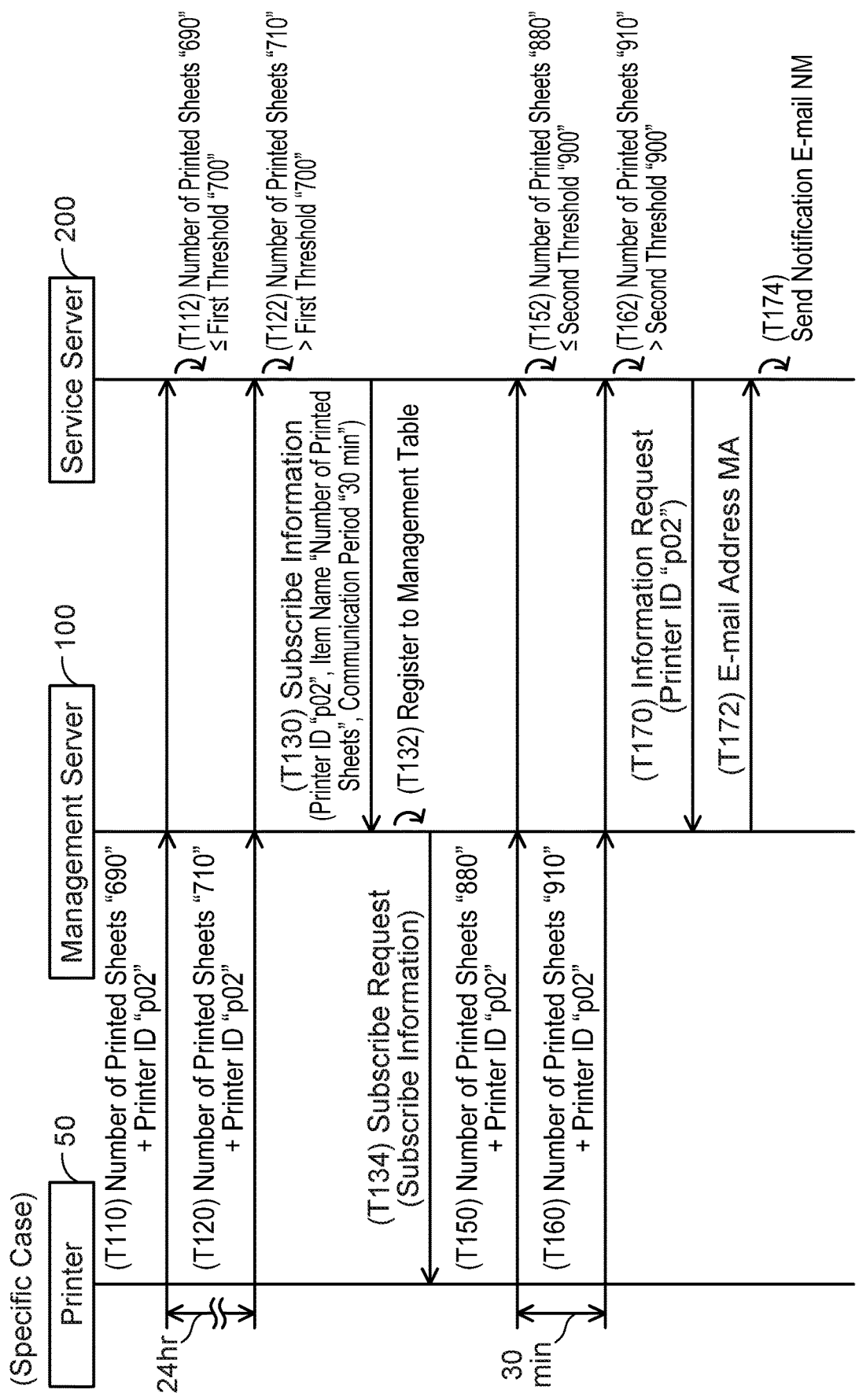

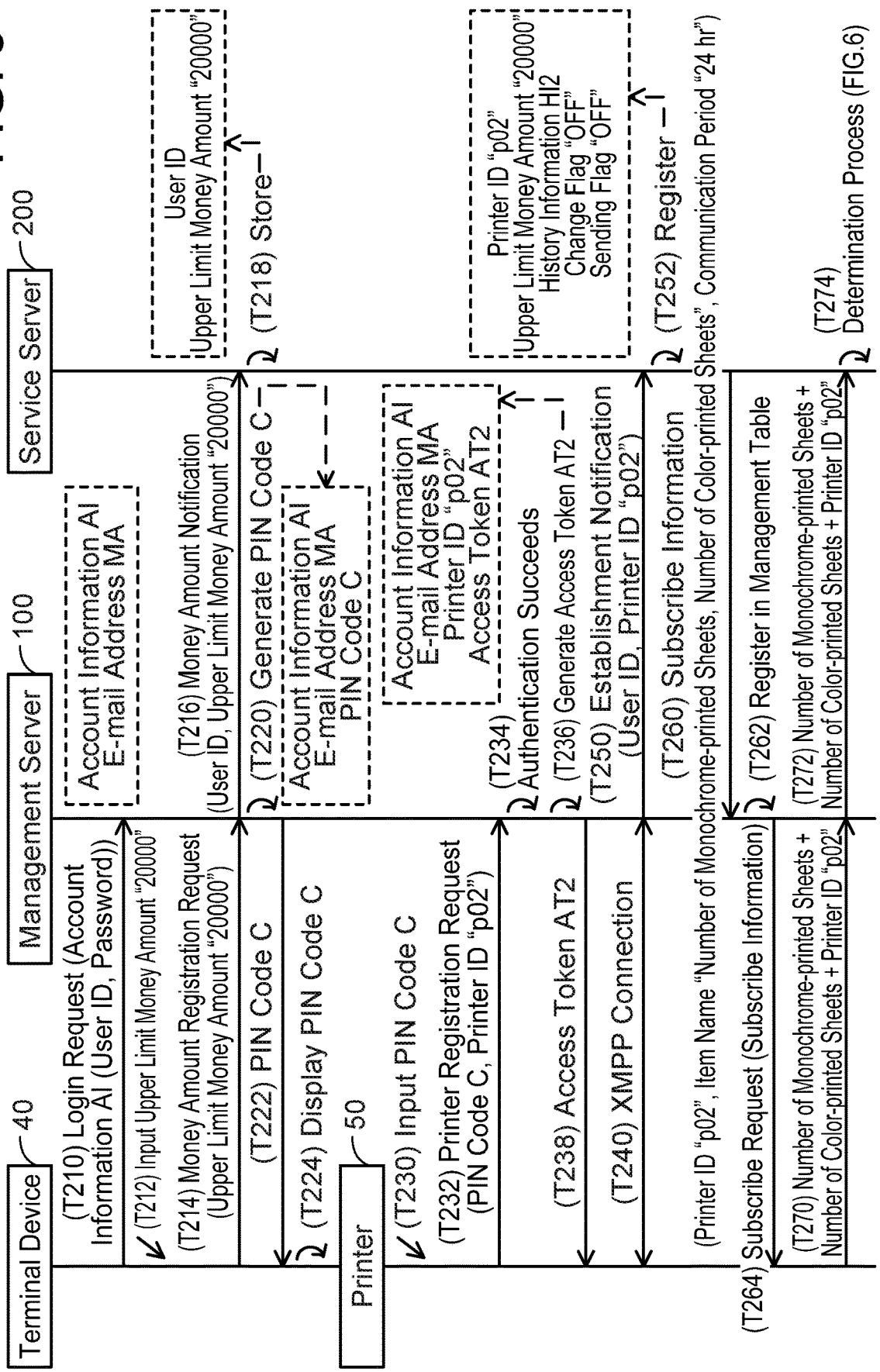

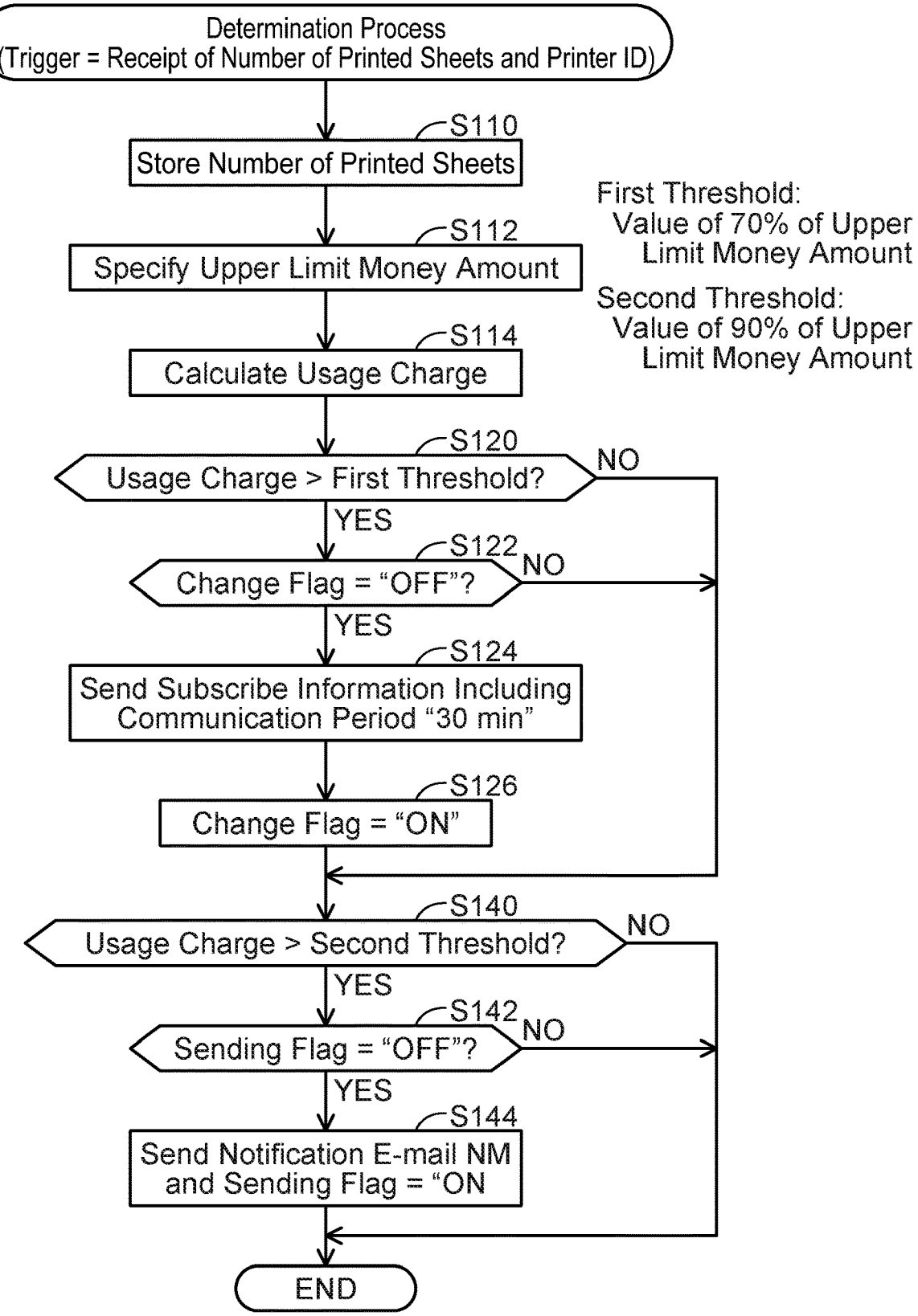

CONTROL DEVICE, SERVER COMPRISING CONTROL DEVICE AND NON-TRANSITORY COMPUTER-READABLE MEDIUM TO EXECUTE RELATED PROCESS RELATED TO PRINT BY USING FIRST AND SECOND THRESHOLDS

CROSS-REFERENCE TO RELATED APPLICATION

This application claims priority to Japanese Patent Application No. 2018-085636 filed on Apr. 26, 2018, the contents of which are hereby incorporated by reference into the present application.

TECHNICAL FIELD

The disclosure herein discloses a technique related to a control device that is configured to execute, by using a print amount of a print executing unit, a process related to print executed by the print executing unit.

DESCRIPTION OF RELATED ART

A management server is known which obtains the number of printed sheets from an MFP every time the MFP executes print, and determines whether the obtained number of printed sheets has reached the number of printable sheets. In a case of determining that the obtained number of printed sheets has reached the number of printable sheets, the management server sends, to the MFP, a predetermined notification for prohibiting print.

SUMMARY

It is assumed that a configuration is adopted in which the management server repeatedly obtains the number of printed sheets with a predetermined period from the MFP (in the disclosure herein, "with a period" means "every period"). If the predetermined period is long, the number of printed sheets in the MFP may greatly exceed the number of printable sheets during a time period from when it was determined that the number of printed sheets obtained at a certain timing has not reached the number of printable sheets until when the long predetermined period has elapsed from that certain timing. Thus, the management server may be unable to send the predetermined notification to the MFP at an appropriate timing. On the other hand, if the predetermined period is short, the number of times the management server obtains the number of printed sheets from the MFP increases, and therefore processing load of the management server increases.

The disclosure herein discloses a technique that executes a related process related to print that is executed by a print executing unit at an appropriate timing while suppressing an increase in processing load of a control device.

A control device disclosed herein may comprise a controller configured to: repeatedly obtain a first related value with a first period, the first related value being related to print amount of a print executing unit; every time the first related value is obtained with the first period, execute a first comparison process of comparing a second related value being related to the print amount and a first threshold being related to the print amount, the second related value being obtained by using the first related value which is obtained at this time; repeatedly obtain the first related value with a second period being shorter than the first period in a case where it is determined in the first comparison process that the print amount being related to the second related value is larger than the print amount being related to the first threshold, wherein the first related value is not obtained with the second period in a case where it is determined in the first comparison process that the print amount being related to the second related value is less than or equal to the print amount being related to the first threshold; every time the first related value is obtained with the second period, execute a second comparison process of comparing the second related value being obtained by using the first related value which is obtained at this time and a second threshold being related to the print amount, wherein the print amount being related to the second threshold is larger than the print amount being related to the first threshold; and execute a related process that is related to print executed by the print executing unit in a case where it is determined in the second comparison process that the print amount being related to the second related value is larger than the print amount being related to the second threshold, wherein the related process is not executed in a case where it is determined in the second comparison process that the print amount being related to the second related value is less than or equal to the print amount being related to the second threshold.

A method implemented by the above control device and a computer program for implementation of the above control device are also novel and useful. A server comprising the above control device are also novel and useful.

BRIEF DESCRIPTION OF THE DRAWINGS

FIG. 4 shows a specific case realized by the determination process;
FIG. 5 shows a sequence diagram of a registration process of a third embodiment;
and
FIG. 6 shows a flowchart of a determination process of the third embodiment.

EMBODIMENTS

Figure 1:
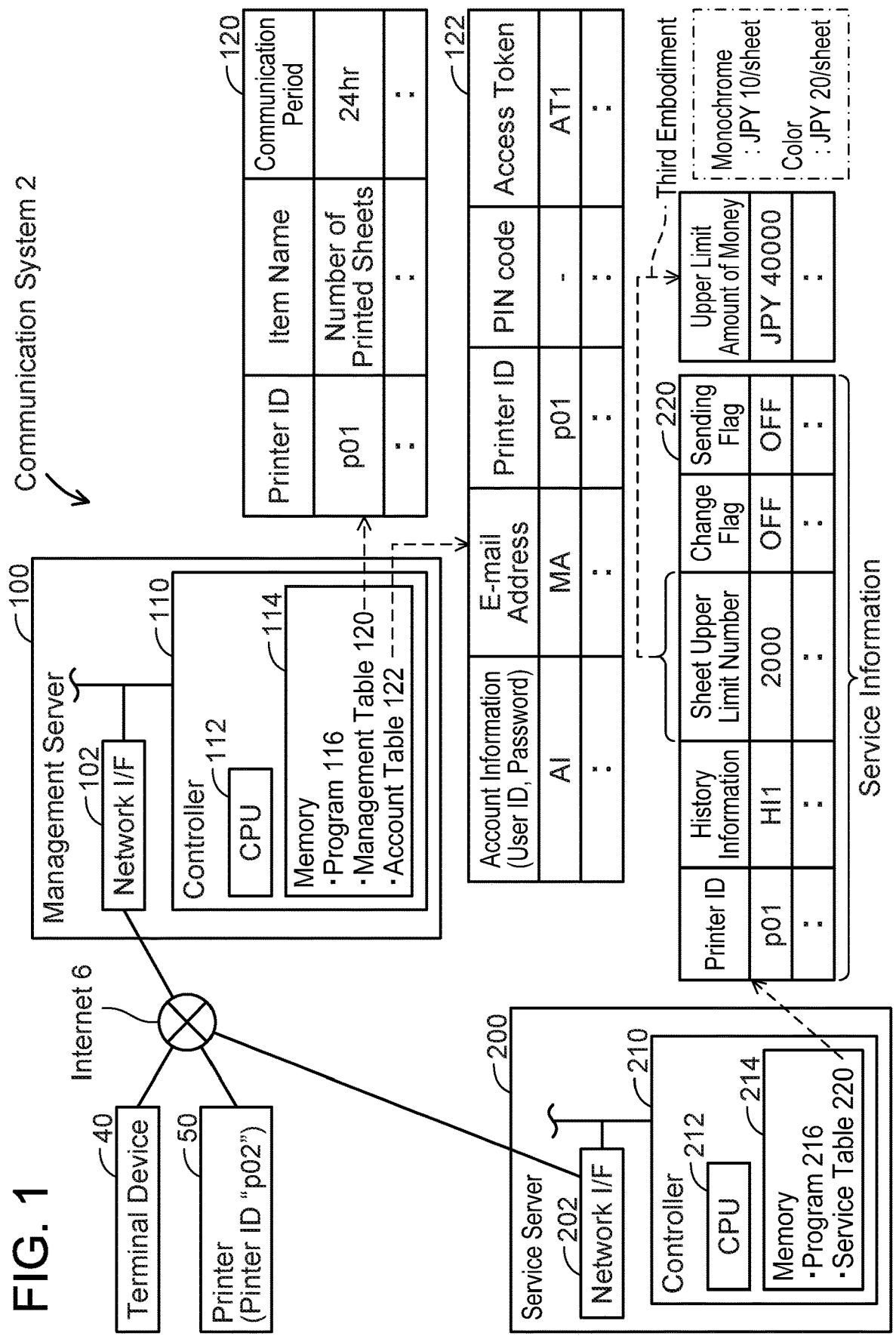
FIG. 1 shows a configuration of a communication system.

First Embodiment (Configuration of Communication System 2; FIG. 1)
As shown in FIG. 1, a communication system 2 comprises a management server 100, and a service server 200 configured separately from the management server 100. The servers 100, 200 are installed on the Internet 6 by a vendor of a printer (e.g., 50) and can mutually communicate with each other via the Internet 6. Each of the servers 100, 200 is a server for collecting information related to a print amount (e.g., the number of printed sheets) from a printer (e.g., 50) and providing a user with a service related to the print amount (e.g., a service of managing an upper limit of the print amount). In a variant, at least one of the servers 100, 200 may be installed by an entity other than the vendor of the printer.

The communication system 2 further comprises a terminal device 40 and a printer 50. The terminal device 40 is a terminal used by a user of the printer. The terminal device 40 is a desktop PC (abbreviation of Personal Computer), a notebook PC, a smartphone, or a tablet terminal, for example. The terminal device 40 is capable of communicating with each of the servers 100, 200 via the Internet 6.

The printer 50 is a peripheral device of the terminal device 40. A printer ID (abbreviation of Identifier) "p02" is assigned to the printer 50. The printer 50 is capable of communicating with each of the servers 100, 200 via the Internet 6.

(Configurations of Servers 100, 200)

The management server 100 is a server mainly for issuing accounts to users, and collecting and registering information related to services. The management server 100 comprises a network interface 102 and a controller 110. Below, an interface will be denoted as "I/F". The units 102, 110 are connected to a bus line (reference sign omitted). The network I/F 102 is connected to the Internet 6. The controller 110 comprises a CPU 112 and a memory 114. The CPU 112 executes various processes in accordance with a program 116 stored in the memory 114. The memory 114 is constituted of a volatile memory, a non-volatile memory, and the like. The memory 114 stores a management table 120 and an account table 122.

The management table 120 is a table for managing communication periods. The communication period is a period with which information related to a print amount (e.g., the number of printed sheets) is repeatedly received from a printer. For each of a plurality of printers, the management table 120 stores, in association with one another, a printer ID (e.g., "p01") of the printer, an item name (e.g., "number of printed sheets") indicating an item of information to be obtained from the printer, and a communication period (e.g., "24 hr") with which information is repeatedly received from the printer.

The account table 122 is a table for managing accounts of users. For each of a plurality of the users, the account table 122 stores, in association with one another, account information (e.g., AI) issued to the user, an e-mail address (e.g., MA) of the user, and a printer ID (e.g., "p01") of a printer used by the user. Each of the account information is a combination of a user ID identifying the user and a password.

In a case, for example, of receiving an instruction to register account information from the terminal device 40, the management server 100 creates account information AI and registers the account information AI in the account table 122. Further, the management server 100 sends the account information AI to the terminal device 40. Thereby, the user can be informed of the account information.

Further, the account table 122 may store a PIN (abbreviation of Personal Identification Number) code and an access token, in association with each of the account information. The PIN code is used when the printer ID is registered in the account table 122. The access token is information for establishing various connections between the management server 100 and the printer via the Internet 6. The connections include, for example, an XMPP (abbreviation of Extensible Messaging and Presence Protocol) connection, an HTTPS (abbreviation of Hypertext Transfer Protocol Secure) connection, etc. The XMPP connection is a so-called constant connection and is a connection that remains established until power of a printer is turned off. By using the XMPP connection, the management server 100 can send a request to a printer across a firewall of a LAN to which the printer belongs, without receiving a request from the printer. The mechanism of sending the request from the management server 100 to a printer may be another method other than the XMPP connection.

The service server 200 is a server mainly for providing services to the users. The service server 200 comprises a network I/F 202 and a controller 210. The units 202, 210 are connected to a bus line (reference sign omitted). The network I/F 202 is connected to the Internet 6. The controller 210 comprises a CPU 212 and a memory 214. The CPU 212 executes various processes in accordance with a program 216 stored in the memory 214. The memory 214 is constituted of a volatile memory, a non-volatile memory, and the like. The memory 214 stores a service table 220.

The service table 220 registers one or more service information. Each of the service information is a combination of a printer ID of a printer used by the user who receives a service, history information indicating a history of the number of printed sheets in the printer, an upper limit number of sheets indicating an upper limit of the number of printed sheets in the printer (hereinbelow "upper limit number of sheets" may be termed "sheet upper limit number"), a change flag, and a sending flag.

The number of printed sheets is the number of print media (e.g., printing paper) printed by a printer (e.g., 50) during a predetermined time period (e.g., one month). The service server 200 repeatedly receives the number of printed sheets with the communication period (e.g., "24 hr") from the printer and stores the received number of printed sheets in the service table 220 as the history information. It should be noted that "with a communication period" means "every communication period".

The change flag indicates one of following values: "ON" indicating that a process of changing a communication period has been executed and "OFF" indicating that the process of changing a communication period has not been executed. Further, the sending flag indicates one of following values: "ON" indicating that a notification e-mail, which is for notifying that a timing at which the number of printed sheets in a printer reaches the sheet upper limit number is close, has been sent to the user, and "OFF" indicating that the notification e-mail has not been sent to the user. Initial values of the change flag and the sending flag are "OFF". The change flag and the sending flag are reset to "OFF" at a beginning of the aforementioned predetermined time period (e.g., one month).

In case of receiving a request for starting provision of a service from, for example, the terminal device 40, the service server 200 registers, in the service table 220, a sheet upper limit number included in the request. Thereby, it is possible to provide the user with a service related to the sheet upper limit number, for example, a service of being able to use the printer without additional charge by paying a charge corresponding to the sheet upper limit number as long as the sheet upper limit number is not exceeded, and a service of notifying that a timing at which the number of printed sheets in the printer reaches the sheet upper limit number is close.

Figure 2:
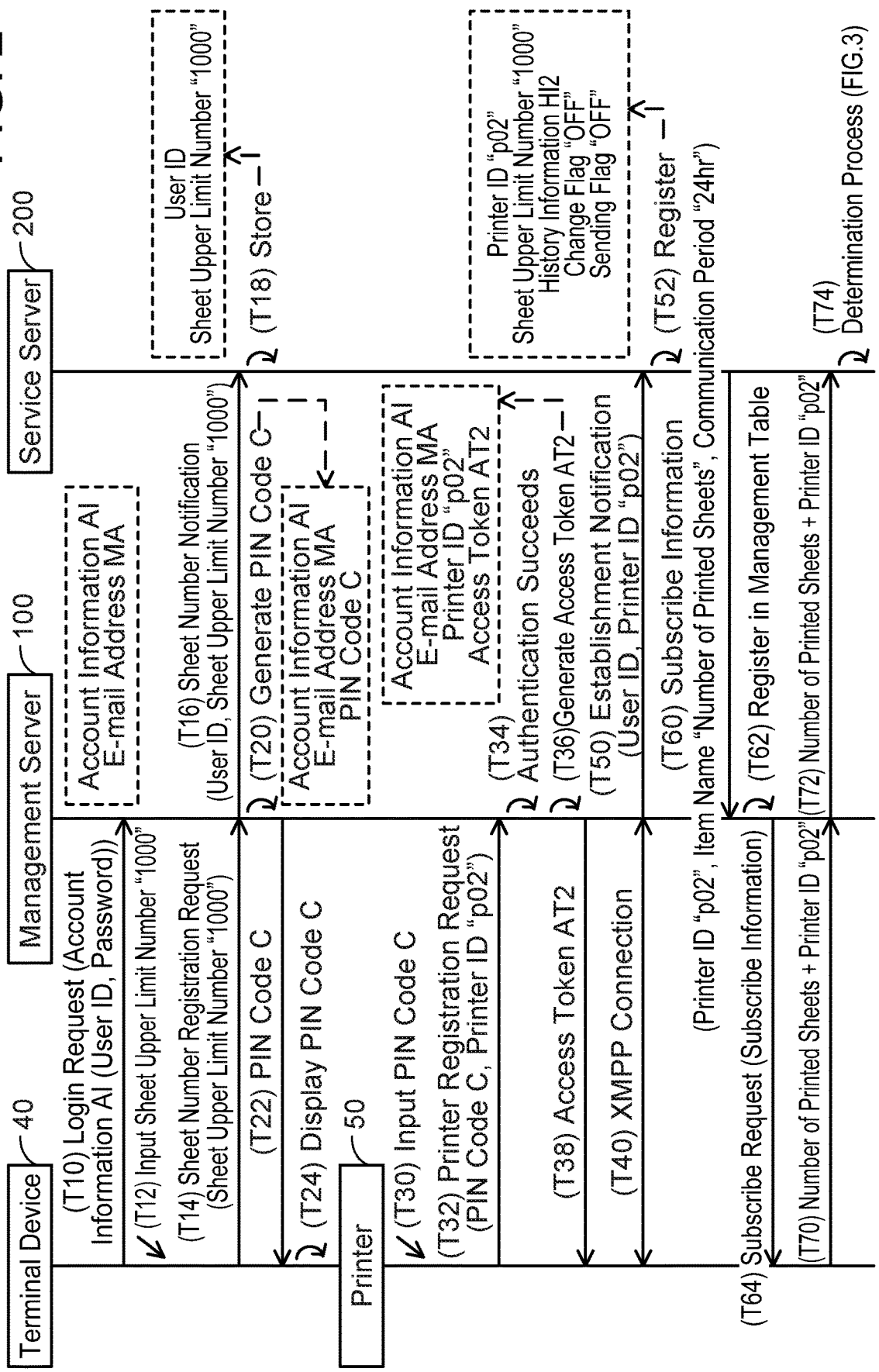
FIG. 2 shows a sequence diagram of a registration process.

(Registration Process; FIG. 2)

A registration process for registering service information in the service server 200 will be described with reference to FIG. 2. The servers 100, 200 each communicate with another device (e.g., the terminal device 40) via the network I/Fs 102, 202. Below, for ease of understanding, description "via the network I/F 102 (or 202)" will be omitted in describing communications between the servers 100, 200 and another device.

In a case where the account information AI is inputted by the user, the terminal device 40 sends a login request including the account information AI to the management server 100 in T10. Since the account information AI has been registered in the management server 100, login of the terminal device 40 to the management server 100 succeeds.

After the login, the terminal device 40 accesses the management server 100 and displays an input screen for inputting a sheet upper limit number necessary for starting provision of a service. In T12, the user inputs a sheet upper limit number "1000" to the input screen.

Upon receiving the input of the sheet upper limit number "1000" from the user in T12, the terminal device 40 sends to the management server 100 in T14 a sheet number registration request for registering the sheet upper limit number. The inputted sheet upper limit number "1000" is included in the sheet number registration request.

Upon receiving the sheet number registration request from the terminal device 40 in T14, the management server 100 sends in T16, to the service server 200, a sheet number notification for notifying the sheet upper limit number included in the sheet number registration request. The sheet number notification includes the user ID included in the account information AI and the sheet upper limit number "1000" included in the sheet number registration request.

Upon receiving the sheet number notification from the management server 100 in T16, the service server 200 stores, in T18, the respective information included in the received sheet number notification (i.e., the user ID and the sheet upper limit number "1000") in the memory 214.

Further, in T20, the management server 100 creates a PIN code C and stores the created PIN code C in the account table 122 in association with the account information AI. In T22, the management server 100 sends the PIN code C to the terminal device 40.

Upon receiving the PIN code C from the management server 100 in T22, the terminal device 40 displays the PIN code C in T24.

After seeing the PIN code C displayed on the terminal device 40, the user operates the printer 50 to input the PIN code C to the printer 50.

Upon receiving the input of the PIN code C from the user in T30, the printer 50 sends in T32, to the management server 100, a printer registration request for requesting registration of its printer ID. The printer registration request includes the inputted PIN code C and the printer ID "p02" of the printer 50.

Upon receiving the printer registration request from the printer 50 in T32, the management server 100 executes authentication of the PIN code C included in the printer registration request in T34. In the present case, since the PIN code C has been stored in the account table 122, the authentication of the PIN code C succeeds.

Since the authentication of the PIN code C succeeds, in T36, the management server 100 creates an access token AT2 and stores the created access token AT2 in the account table 122 in association with the account information AI. In T38, the management server 100 sends the access token AT2 to the printer 50.

Upon receiving the access token AT2 from the management server 100 in T38, the printer 50 uses the access token AT2 to establish an XMPP connection with the management server 100 in T40.

Upon the XMPP connection being established with the printer 50 in T40, the management server 100 sends in T50, to the service server 200, an establishment notification indicating that the XMPP connection has been established. The establishment notification includes the user ID included in the account information AI and the printer ID "p02" associated with the account information AI in the account table 122.

Upon receiving the establishment notification from the management server 100 in T50, the service server 200 registers in T52, in the service table 220, service information including the printer ID "p02" included in the establishment notification. Specifically, the service server 200 uses the user ID included in the establishment notification to specify the sheet upper limit number "1000" stored in the memory 214. Then, the service server 200 registers, in the service table 220, service information including the printer ID "p02" included in the establishment notification, the specified sheet upper limit number "1000", history information HI2, the change flag "OFF", and the sending flag "OFF". At this stage, the history information HI2 is empty information that does not include any number of printed sheets.

In T60, the service server 200 sends (i.e., supplies) Subscribe information to the management server 100. The Subscribe information is information for requesting the management server 100 to send a Subscribe request. The Subscribe information includes the printer ID "p02", an item name "number of printed sheets", and the communication period "24 hr". The communication period is not limited to "24 hr". For example, the communication period may be a value smaller than "24 hr" (e.g., "12 hr") or a value larger than "24 hr" (e.g., "48 hr").

Upon receiving the Subscribe information from the service server 200 in T60, the management server 100 registers in T62 the respective information included in the Subscribe information in the management table 120. In T64, the management server 100 uses the XMPP connection established in T40 to send (i.e., supply) a Subscribe request including the Subscribe information to the printer 50. The Subscribe request is a command for requesting the printer 50 to repeatedly send the number of printed sheets indicated by the item name included in the Subscribe information with the communication period included in the Subscribe information.

Upon receiving the Subscribe request from the management server 100 in T64, the printer 50 repeatedly sends in T70 the number of printed sheets and the printer ID "p02" to the management server 100 with the communication period "24 hr" included in the Subscribe request. According to such a configuration, the management server 100 can repeatedly receive the number of printed sheets from the printer 50 without repeatedly requesting the printer 50 to send the number of printed sheets with the communication period "24 hr". Since there is no need for the repeated request with the communication period "24 hr", an increase in processing load of the management server 100 can be suppressed.

Upon receiving the number of printed sheets and the printer ID "p02" from the printer 50 in T70, the management server 100 sends the number of printed sheets and the printer ID "p02" to the service server 200 in T72.

Upon receiving (i.e., obtaining) the number of printed sheets and the printer ID "p02" from the management server 100 in T72, the service server 200 executes a determination process to be described later (FIG. 3) in T74.

Figure 3:
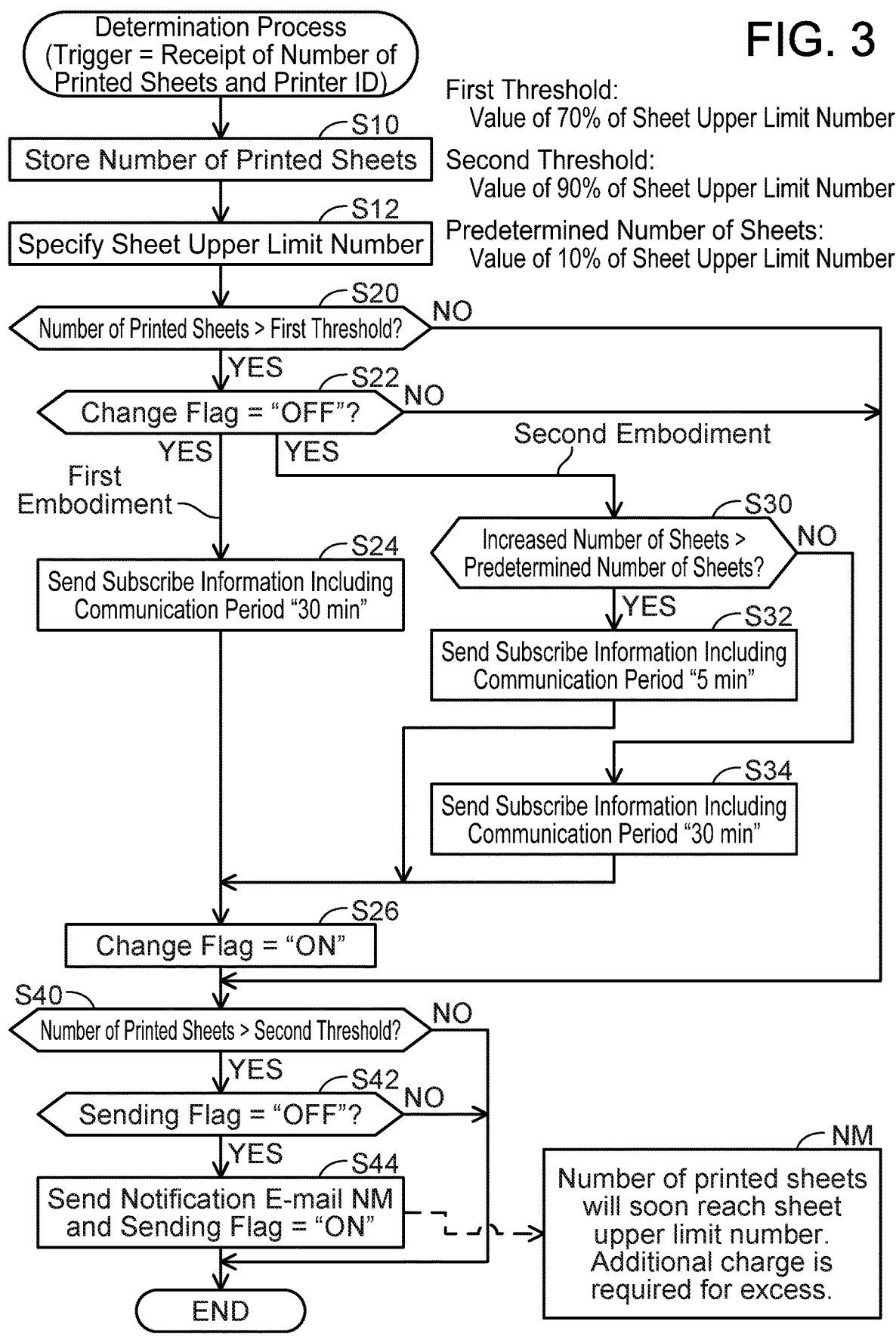
FIG. 3 shows a flowchart of a determination process.

(Determination Process; FIG. 3)

The determination process executed by the CPU 212 of the service server 200 in accordance with the program 216 will be described with reference to FIG. 3. The determination process of FIG. 3 is executed each time the number of printed sheets and the printer ID are received with the communication period.

In S10, the CPU 212 stores, in the service table 220, the number of printed sheets received from the printer 50 via the management server 100. Specifically, the CPU 212 specifies, from the service table 220, the history information corresponding to the printer ID (called "target printer ID" below)

received together with the number of printed sheets. The CPU 212 stores the received number of printed sheets in the service table 220 as the specified history information.

In S12, the CPU 212 specifies, from the service table 220, the sheet upper limit number corresponding to the target printer ID.

In S20, the CPU 212 determines whether the latest number of printed sheets in the history information is larger than a first threshold. Here, the first threshold is a value of 70% of the specified sheet upper limit number. That is, the first threshold is a value smaller than the specified sheet upper limit number. In case of determining that the latest number of printed sheets is less than or equal to the first threshold (NO in S20), the CPU 212 skips processes from S22 onward, and proceeds to S40. On the other hand, in case of determining that the latest number of printed sheets is larger than the first threshold (YES in S20), the CPU 212 proceeds to S22.

In S22, the CPU 212 determines whether the change flag corresponding to the target printer ID in the service table 220 indicates "OFF". In case of determining that the change flag indicates "ON" (NO in S22), the CPU 212 skips S24, S26, and proceeds to S40. On the other hand, in case of determining that the change flag indicates "OFF" (YES in S22), the CPU 212 proceeds to S24.

In S24, the CPU 212 sends, to the management server 100, Subscribe information including a communication period "30 min" that is shorter than the current communication period "24 hr". Thereby, the management server 100 uses the XMPP connection with the printer 50 to send a Subscribe request including the Subscribe information to the printer 50. As a result, the printer 50 repeatedly sends the number of printed sheets to the management server 100 (see T70 of FIG. 2) with the communication period "30 min" included in the Subscribe request. The communication period is not limited to "30 min". For example, the communication period may be a value smaller than "30 min" (e.g., "15 min"), or a value larger than "30 min" (e.g., "1 hr").

In S26, the CPU 212 changes the change flag corresponding to the target printer ID in the service table 220 from "OFF" to "ON".

In S40, the CPU 212 determines whether the latest number of printed sheets in the history information is larger than a second threshold. Here, the second threshold is a value of 90% of the specified sheet upper limit number. That is, the second threshold is a value smaller than the sheet upper limit number specified in S12 and larger than the first threshold. In case of determining that the latest number of printed sheets is less than or equal to the second threshold (NO in S40), the CPU 212 skips processes of S42 onward, and ends the process of FIG. 3. On the other hand, in case of determining that the latest number of printed sheets is larger than the second threshold (YES in S40), the CPU 212 proceeds to S42.

In S42, the CPU 212 determines whether the sending flag corresponding to the target printer ID in the service table 220 indicates "OFF". In case of determining that the sending flag indicates "ON" (NO in S42), the CPU 212 skips S44, and ends the process of FIG. 3. On the other hand, in case of determining that the sending flag indicates "OFF" (YES in S42), the CPU 212 proceeds to S44.

In S44, the CPU 212 sends a notification e-mail NM to give a notification to the user. Specifically, the CPU 212 sends, to the management server 100, an information request requesting an e-mail address corresponding to the target printer ID. Upon sending the information request to the management server 100, the CPU 212 receives, from the management server 100, the e-mail address corresponding to the target printer ID included in the information request. Then, the CPU 212 sends the notification e-mail NM with the received e-mail address as its destination. By reading a message in the notification e-mail NM, the user can be informed that the number of printed sheets in the printer 50 is close to the sheet upper limit number.

Further, in S44, the CPU 212 changes the change flag corresponding to the target printer ID in the service table 220 from "OFF" to "ON". When S44 ends, the process of FIG. 3 ends.

As described above, the first threshold is a value of 70% of the sheet upper limit number, and the second threshold is a value of 90% of the sheet upper limit number. In other words, the first threshold is a value obtained by multiplying the sheet upper limit number by a first ratio, and the second threshold is a value obtained by multiplying the sheet upper limit number by a second ratio larger than the first ratio. For example, the first ratio is not limited to a ratio indicated by 70%, and it may be a ratio indicated by a percentage smaller than 70% or may be a ratio indicated by a percentage larger than 70%. Together with this, the second ratio is not limited to a ratio indicated by 90% either, and it may be any ratio larger than the first ratio. In a variant, the first threshold may be a value obtained by subtracting a first predetermined number of sheets (e.g., "300") from the sheet upper limit number, and the second threshold may be a value obtained by subtracting, from the sheet upper limit number, a second predetermined number of sheets (e.g., "100") smaller than the first predetermined number of sheets.

(Specific Case; FIG. 4)

A specific case realized by the determination process of FIG. 3 will be described with reference to FIG. 4. The case of FIG. 4 is a continuation of the registration process of FIG. 2.

In T110, the service server 200 receives the number of printed sheets "690" and the printer ID "p02" from the printer 50 via the management server 100 (see T72 of FIG. 2). In T112, the service server 200 executes the determination process of FIG. 3 and determines that the number of printed sheets "690" is less than the first threshold "700", which is 70% of the sheet upper limit number "1000" corresponding to the printer ID "p02" (NO in S20 of FIG. 3). For this reason, the service server 200 ends the determination process without sending the Subscribe information to the management server 100, and the communication period is thus maintained at "24 hr".

T120, which takes place after the communication period "24 hr" has elapsed from T110, is the same as T110 excepting that the number of printed sheets "710" is received. In T122, the service server 200 executes the determination process of FIG. 3 and determines that the number of printed sheets "710" is larger than the first threshold "700" (YES in S20 of FIG. 3). Since the change flag corresponding to the printer ID "p02" indicates "OFF" (YES in S22), the service server 200 sends in T130 the Subscribe information including the communication period "30 min" to the management server 100. T132 is the same as T62 of FIG. 2 excepting that the communication period "30 min" is registered in the management table 120. T134 is the same as T64 of FIG. 2 excepting that the Subscribe request includes the communication period "30 min". Thereby, the printer 50 repeatedly sends the number of printed sheets and the printer ID "p02" to the management server 100 with the communication period "30 min" included in the Subscribe request.

In T150, the service server 200 receives the number of printed sheets "880" and the printer ID "p02" from the printer 50 via the management server 100 (see T72 of FIG. 2). In T152, the service server 200 executes the determination process of FIG. 3 and determines that the number of printed sheets "880" is less than the second threshold "900", which is 90% of the sheet upper limit number "1000" corresponding to the printer ID "p02" (NO in S40 of FIG. 3). For this reason, the service server 200 ends the determination process without sending the notification e-mail NM.

T160, which takes place after the communication period "30 min" has elapsed from T150, is the same as T150 excepting that the number of printed sheets "910" is received. In T162, the service server 200 executes the determination process of FIG. 3 and determines that the number of printed sheets "910" is larger than the second threshold "900" (YES in S40 of FIG. 3). Since the sending flag corresponding to the printer ID "p02" indicates "OFF" (YES in S42), the service server 200 sends in T170 the information request including the printer ID "p02" to the management server 100 (S44). In T172, the service server 200 receives, from the management server 100, the e-mail address MA corresponding to the printer ID "p02" included in the information request (S44). In T174, the service server 200 sends the notification e-mail NM with the e-mail address MA as the destination (S44).

According to the present case, each time the service server 200 receives the number of printed sheets with the communication period "24 hr" (T110, T120 of FIG. 4), the service server 200 determines whether the latest number of printed sheets is larger than the first threshold "700" (T112, T122). In the case of determining that the latest number of printed sheets is larger than the first threshold "700", the service server 200 sends the Subscribe information including the communication period "30 min" to the management server 100 (T130). Thereby, the service server 200 repeatedly receives the number of printed sheets with the communication period "30 min" that is shorter than the communication period "24 hr" (T150, T160). A situation in which the latest number of printed sheets is larger than the first threshold "700" means that a timing at which it is determined in S40 of FIG. 3 that the latest number of printed sheets is larger than the second threshold "900" (i.e., a timing at which the notification e-mail NM is to be sent) is close. If the service server 200 still repeatedly receives the number of printed sheets with the communication period "24 hr" even after having received the number of printed sheets "710" in T120 of FIG. 4, the number of printed sheets in the printer 50 may greatly exceed the sheet upper limit number "1000" during a time period from the timing of T120 until when the relatively long communication period "24 hr" elapses. On the other hand, by changing the communication period from "24 hr" to the significantly shorter "30 min" as described above, it is possible to suppress the notification e-mail NM from being sent after the number of printed sheets in the printer 50 has greatly exceeded the sheet upper limit number "1000". That is, the notification e-mail NM can be sent at an appropriate timing before the number of printed sheets in the printer 50 exceeds the sheet upper limit number "1000".

Further, a situation in which the latest number of printed sheets is less than or equal to the first threshold "700" means that the timing at which it is determined in S40 of FIG. 3 that the latest number of printed sheets is larger than the second threshold "900" is not close. Since the communication period is maintained at "24 hr" in such a situation (i.e., since the period with which the number of printed sheets is received is not shortened) as shown in T112 of FIG. 4, it is possible to suppress an increase in the processing load of the service server 200.

(Correspondence Relationships)

The controller 210, the service server 200, and the printer 50 are examples of "control device", "server", and "print executing unit", respectively. The network I/F 202 is an example of "communication interface". The number of printed sheets is an example of "first related value", "second related value". The sheet upper limit number is an example of "upper value". The communication period "24 hr" and the communication period "30 min" are examples of "first period" and "second period". The sending of the notification e-mail in S44 of FIG. 3 is an example of "related process". The Subscribe information of T60 of FIG. 2 and the Subscribe information of T130 of FIG. 4 are examples of "first request information" and "second request information", respectively. The printer ID is an example of "related information".

T110, T120 of FIG. 4 are examples of "repeatedly obtain a first related value with a first period". S20 of FIG. 3 and S40 of FIG. 3 are examples of "execute a first comparison process" and "execute a second comparison process", respectively. T150, T160 of FIG. 4 are examples of "repeatedly obtain the first related value with a second period". S44 of FIG. 3 is an example of "execute a related process".

Second Embodiment (Determination Process; FIG. 3)

A determination process of the present embodiment is the same as that of the first embodiment excepting that processes of S30 to S34 are executed instead of S24.

In case of determining that the change flag indicates "OFF" (YES in S22), the CPU 212 determines whether an increased number of printed sheets is larger than a predetermined number of sheets (hereinbelow, "increased number of printed sheets" may be termed "increased sheet number"). Here, the increased sheet number is an increment between the latest number of printed sheets and the second latest number of printed sheets among the plurality of numbers of printed sheets included in the history information corresponding to the target printer ID. The predetermined number of sheets is a value of 10% of the sheet upper limit number. In case of determining that the increased sheet number is larger than the predetermined number of sheets (YES in S30), the CPU 212 proceeds to S32. On the other hand, in case of determining that the increased sheet number is less than or equal to the predetermined number of sheets (NO in S30), the CPU 212 proceeds to S34.

In S32, the CPU 212 sends Subscribe information including a communication period "5 min" to the management server 100. On the other hand, in S34, the CPU 212 sends the Subscribe information including the communication period "30 min" to the management server 100. That is, in the case where it is determined in S30 that the increased sheet number is larger than the predetermined number of sheets, the service server 200 repeatedly obtains the number of printed sheets from the printer 50 with the communication period "5 min" which is shorter than the communication period "30 min".

In S30 described above, the determination that the increased sheet number is larger than the predetermined number of sheets means that the number of printed sheets has drastically increased within the communication period "24 hr" that took place most recently. Under such circumstances, there is a high possibility that the number of printed sheets in the printer 50 will become larger than the second threshold earlier and the timing at which the notification e-mail NM is to be sent will be reached earlier. Under such circumstances, by further shortening the period with which the number of printed sheets is received, it is possible to send the notification e-mail NM at an appropriate timing.

As described above, the increased sheet number is an increment between the latest number of printed sheets and the second latest number of printed sheets. Instead, the increased sheet number may be a variation in the number of printed sheets per unit period that is calculated by using two or more numbers of printed sheets, which include the latest number of printed sheets, among the plurality of numbers of printed sheets included in the history information. That is, in S30, the CPU 212 may determine whether the variation in the number of printed sheets within the communication period that took place most recently is larger than the predetermined number of sheets.

Further, the predetermined number of sheets is not limited to a value of 10% of the sheet upper limit number, and it may be a value of 15% of the sheet upper limit number or a value of 5% of the sheet upper limit number. That is, the predetermined number of sheets may be any value obtained by multiplying the sheet upper limit number by a certain ratio. In a variant, the predetermined number of sheets may be a value predetermined by the vendor.

(Correspondence Relationships)

The increased sheet number is an example of "absolute value of variation". The communication period "5 min" is an example of "third period".

Third Embodiment

As shown in FIG. 1, in the present embodiment, the service table 220 stores an upper limit amount of money (hereinbelow "upper limit amount of money" may be termed "upper limit money amount"), instead of the sheet upper limit number. The printer 50 is capable of executing a plural types of print (e.g., monochrome print, color print, duplex print, print onto paper of various sizes (A3, A4, etc.)). For example, when the user uses the printer 50, a service is assumed which charges 10 yen for executing monochrome print on one print medium and charges 20 yen for executing color print on one print medium. The aforementioned upper limit money amount (e.g., "40000 yen") indicates an upper limit of a total amount of money charged for monochrome print and color print. As long as the upper limit money amount is not exceeded, the user can use, without additional charge, the plural types of print that the printer 50 is capable of executing.

(Registration Process; FIG. 5)

A registration process in the present embodiment will be described with reference to FIG. 5. T210 is the same as T10 of FIG. 2. T212 is the same as T12 of FIG. 2 excepting that an upper limit money amount "20000 yen" is inputted. T214 is the same as T14 of FIG. 2 excepting that a money amount registration request including the upper limit money amount "20000 yen" is sent. T216 is the same as T16 of FIG. 2 excepting that a money amount notification including the upper limit money amount "20000 yen" is sent. T218 is the same as T18 of FIG. 2 excepting that the upper limit money amount "20000 yen" is stored. T220 to T250 are the same as T20 to T50 of FIG. 2. T252 is the same as T52 of FIG. 2 excepting that service information including the upper limit money amount "20000 yen" is registered.

T260 is the same as T60 of FIG. 2 excepting that an item name "number of monochrome-printed sheets, number of color-printed sheets" is included in the Subscribe information. The number of monochrome-printed sheets is the number of print media printed by monochrome print in the printer 50 within a predetermined time period (e.g., one month), and the number of color-printed sheets is the number of print media printed by color print in the printer 50 within the predetermined time period (e.g., one month). T264 is the same as T64 of FIG. 2. T270, T272 are the same as T70, T72 of FIG. 2 excepting that the number of monochrome-printed sheets and the number of color-printed sheets are sent. Then, upon receiving the number of monochrome-printed sheets, the number of color-printed sheets and the printer ID "p02" from the management server 100 in T272, the service server 200 executes a determination process to be described later (FIG. 6) in T274.

(Determination Process; FIG. 6)

The determination process of the present embodiment will be described with reference to FIG. 6. S110 is the same as S10 of FIG. 3. S112 is the same as S12 of FIG. 3 excepting that the upper limit money amount is specified. In S114, the CPU 212 calculates a usage charge by using the latest number of monochrome-printed sheets and the latest number of color-printed sheets in the history information. Specifically, the CPU 212 multiplies the latest number of monochrome-printed sheets by a charge per sheet (e.g., 10 yen) to calculate the charge for monochrome print, multiplies the latest number of color-printed sheets by a charge per sheet (e.g., 20 yen) to calculate the charge for color print, and sums the charge for monochrome print and the charge for color print to calculate the usage charge.

In S120, the CPU 212 determines whether the usage charge calculated in S114 is larger than a first threshold. Here, the first threshold is a value of 70% of the specified upper limit money amount. In case of determining that the usage charge is less than or equal to the first threshold (NO in S120), the CPU 212 skips processes of S122 onward, and proceeds to S140. On the other hand, in case of determining that the usage charge is larger than the first threshold (YES in S120), the CPU 212 proceeds to S122. S122 to S126 are the same as S22 to S26 of FIG. 2.

In S140, the CPU 212 determines whether the usage charge calculated in S114 is larger than a second threshold. Here, the second threshold is a value of 90% of the specified upper limit money amount. In case of determining that the usage charge is less than or equal to the second threshold (NO in S140), the CPU 212 skips processes of S142 onward, and ends the process of FIG. 6. On the other hand, in case of determining that the usage charge is larger than the second threshold (YES in S140), the CPU 212 proceeds to S142. S142, S144 are the same as S42, S44 of FIG. 2.

In the present embodiment as well, as in the first embodiment, it is possible to send, at an appropriate timing, the notification e-mail NM for informing the user that the usage charge corresponding to the number of printed sheets in the printer 50 is close to the upper limit money amount. Further, in a situation where the usage charge is less than or equal to the first threshold, the communication period is maintained at "24 hr", by which it is possible to suppress an increase in the processing load of the service server 200. Monochrome print and color print are examples of "plural types of print". The number of monochrome-printed sheets and the number of color-printed sheets are examples of "plurality of first related values". The upper limit money amount and the usage charge are examples of "upper value" and "second related value", respectively.

(Variant 1) In each of the above embodiments, the service server 200 repeatedly receives the number of printed sheets with the communication period from the printer 50 (T72 of FIG. 2). Instead, the service server 200 may repeatedly receive the number of cartridge replacements with the communication period from the printer 50 (T72 of FIG. 2). The number of cartridge replacements is the number of cartridges that have been used by the printer 50. In a case where it is determined that the latest number of cartridge replacements is larger than a first threshold (e.g., a value obtained by subtracting 3 from an upper limit of the number of replacements "5"), the service server 200 may send Subscribe information including the communication period "30 min" to the management server 100 (see S24 of FIG. 3). Further, in a case where it is determined that the latest number of cartridge replacements is larger than a second threshold (e.g., a value obtained by subtracting 2 from the upper limit of the number of replacements "5"), the service server 200 may send a notification e-mail notifying the user that the number of cartridge replacements is close to the upper limit (see S44 of FIG. 3). In the present variant, the number of replacements is an example of "first related value", "second related value".

(Variant 2) In each of the above embodiments, the service server 200 stores the service information including the printer ID in the service table 220. Instead, the service server 200 may store service information including the user ID in the service table 220. In this case, the service server 200 may receive the number of printed sheets and the user ID from the printer 50 (T72 of FIG. 2) and use the user ID to specify the sheet upper limit number (see S12 of FIG. 3). In the present variant, the user ID is an example of "related information".

(Variant 3) In each of the above embodiments, the service server 200 sends the notification e-mail NM (see S44 of FIG. 3). Instead, the service server 200 may execute an order process for ordering additional print media. In the present variant, the order process is an example of "related process".

(Variant 4) In the above first and second embodiments, the service server 200 determines in S20 of FIG. 3 whether the latest number of printed sheets is larger than the first threshold. Instead, the service server 200 may determine whether the number of remaining sheets, which is a difference between the sheet upper limit number and the latest number of printed sheets, is smaller than a specific threshold (e.g., a value of 30% of the sheet upper limit number). In a case of determining that the number of remaining sheets is smaller than the specific threshold, the service server 200 may execute the process of S24. In the present variant, the process of determining whether the number of remaining sheets is smaller than the specific threshold is an example of "first comparison process". Further, in S30 of FIG. 3 in the second embodiment, the service server 200 may determine whether an absolute value of a difference between the latest number of remaining sheets and the second latest number of remaining sheets is larger than a predetermined number of sheets (e.g., a value of 10% of the sheet upper limit number). In the present variant, the absolute value of the difference between the two numbers of remaining sheets is an example of "absolute value of variation".

(Variant 5) In the above second embodiment, the service server 200 determines the communication period to be either "30 min" or "5 min" according to the increased number of sheets (S30 of FIG. 3). Instead, the service server 200 may determine the communication period to be any one of three or more periods (e.g., "30 min", "5 min", "1 min") according to the increased number of sheets. For example, the service server 200 may determine the communication period to be "30 min" in a case where the increased number of sheets is equal to or less than a first predetermined number of sheets, determine the communication period to be "5 min" in a case where the increased number of sheets is larger than the first predetermined number of sheets and is equal to or less than a second predetermined number of sheets, and determine the communication period to be "1 min" in a case where the increased number of sheets is larger than the second predetermined number of sheets. In the present variant, the communication period "5 min" and the communication period "1 min" are examples of "second period" and "third period", respectively.

(Variant 6) In the above second embodiment, the service server 200 determines the communication period to be either "30 min" or "5 min" according to the increased number of sheets (S30 of FIG. 3). Instead, the service server 200 may store a predetermined formula for determining the communication period from the increased number of sheets. Then, in the case of determining YES in S20 of FIG. 3, the service server 200 may determine the communication period from the increased number of sheets by using the predetermined formula. In the present variant, the communication period calculated by using the predetermined formula is an example of "second period".

(Variant 7) In each of the above embodiments, the determination process is executed by the service server 200. Instead, the communication system 2 may not comprise the service server 200, and the determination process may be executed by the management server 100. In the present variant, the controller 110 and the management server 100 are examples of "control device" and "server", respectively.

(Variant 8) The service server 200 may not store the sheet upper limit number. The service server 200 may determine in S20 whether the number of printed sheets is larger than a predetermined first threshold and, may determine in S40 whether the number of printed sheets is larger than a predetermined second threshold. In the present variant, "upper value" can be omitted.

(Variant 9) In the above third embodiment, the printer 50 is capable of executing the plural types of print. Instead, the printer 50 may be capable of executing only one type of print. Then, in S114 of FIG. 6, the service server 200 may calculate a usage charge corresponding to the number of printed sheets by the one type of print. In the present variant, "second related value" is a charge obtained by using one first related value.

(Variant 10) In each of the above embodiments, the service server 200 sends the Subscribe information to the printer 50 via the management server 100 (T64 of FIG. 2). Instead, the service server 200 may repeatedly receive the number of printed sheets from the printer 50 by repeatedly sending a predetermined request for requesting sending of the number of printed sheets with the communication period "24 hr" to the printer 50. In the present variant, "supply first request information" and "supply second request information" can be omitted.

(Variant 11) In each of the above embodiments, the determination process is executed by the service server 200. Instead, the determination process may be executed by a controller (CPU) of the printer 50. In this case, the printer 50 may count the number of printed sheets and store this number in a memory of the printer 50 each time print is executed. Then, the CPU may repeatedly obtain the number of printed sheets with a first period from the memory, and may repeatedly obtain the number of printed sheets with a second period that is shorter than the first period from the memory in a case where the newly obtained number of printed sheets is larger than the first threshold. In a case where the newly obtained number of printed sheets is larger than the second threshold, the CPU may display a predetermined notification (e.g., a notification indicating that the number of printed sheets is close to the upper limit) on a display unit of the printer 50. In the present variant, the controller of the printer 50 is an example of "control device", and displaying the predetermined notification on the display unit is an example of "related process". Further, in the present variant, "related information" can be omitted.

(Variant 12) In each of the above embodiments, the respective processes of FIG. 3 are executed by the CPU 212 of the service server 200 executing the program 216 (that is, software). Instead of this, one or more of the processes may be implemented by hardware such as logic circuits.

What is claimed is:

1. A control device comprising:
a controller configured to:
repeatedly obtain a first related value with a first period, the first related value being related to print amount of a print executing unit;
every time the first related value is obtained with the first period, execute a first comparison process of comparing a second related value being related to the print amount and a first threshold being related to the print amount, the second related value being obtained by using the first related value which is obtained at this time;
repeatedly obtain the first related value with a second period being shorter than the first period in a case where it is determined in the first comparison process that the print amount being related to the second related value is larger than the print amount being related to the first threshold, wherein the first related value is not obtained with the second period in a case where it is determined in the first comparison process that the print amount being related to the second related value is less than or equal to the print amount being related to the first threshold;
every time the first related value is obtained with the second period, execute a second comparison process of comparing the second related value being obtained by using the first related value which is obtained at this time and a second threshold being related to the print amount, wherein the print amount being related to the second threshold is larger than the print amount being related to the first threshold; and
execute a related process that is related to print executed by the print executing unit in a case where it is determined in the second comparison process that the print amount being related to the second related value is larger than the print amount being related to the second threshold, wherein the related process is not executed in a case where it is determined in the second comparison process that the print amount being related to the second related value is less than or equal to the print amount being related to the second threshold.

2. The control device as in claim 1, wherein
the first comparison process is a process of determining whether the second related value is larger than the first threshold,
the second comparison process is a process of determining whether the second related value is larger than the second threshold,
the first threshold is a value less than an upper value that is an upper limit of the second related value, and
the second threshold is a value less than the upper value and larger than the first threshold.

3. The control device as in claim 1, wherein
the first related value is the number of print media that have been printed by the print executing unit, and
the second related value is identical to the first related value.

4. The control device as in claim 1, wherein
the first related value is the number of cartridges that have been used by the print executing unit, and
the second related value is identical to the first related value.

5. The control device as in claim 1, wherein
the second related value is a charge that is obtained by using the first related value and is charged according to the print amount.

6. The control device as in claim 5, wherein
a plurality of the first related values is obtained with the first period,
the plurality of the first related values corresponds to a plural types of print that the print executing unit is capable of executing,
the plurality of the first related values is obtained with the second period, and
the second related value is the charge obtained by using the plurality of the first related values.

7. The control device as in claim 1, wherein
the controller is further configured to:
determine whether an absolute value of variation of the first related value within the latest first period is larger than a predetermined value in the case where it is determined in the first comparison process that the print amount being related to the second related value is larger than the print amount being related to the first threshold;
repeatedly obtain the first related value with a third period being shorter than the second period in a case where it is determined that the absolute value of the variation is larger than the predetermined value; and
every time the first related value is obtained with the third period, execute the second comparison process,
wherein the first related value is obtained with the second period in a case where it is determined that the absolute value of the variation is less than or equal to the predetermined value.

8. A server comprising:
the control device as in claim 1; and
a communication interface,
wherein the first related value is repeatedly obtained with the first period from a target printer comprising the print executing unit via the communication interface, and
the first related value is repeatedly obtained with the second period from the target printer via the communication interface.

9. The server as in claim 8, wherein
the controller is further configured to:
supply first request information to the target printer via the communication interface, the first request information being for requesting to repeatedly supply the first related value with the first period,
wherein in response to the first request information being supplied to the target printer, the first related value is repeatedly obtained with the first period from the target printer without repeatedly requesting the target printer to supply the first related value; and
supply second request information to the target printer via the communication interface in the case where it is determined in the first comparison process that the print amount being related to the second related value is larger than the print amount being related to the first threshold, the second request information being for requesting to repeatedly supply the first related value with the second period, wherein in response to the second request information being supplied to the target printer, the first related value is repeatedly obtained with the second period from the target printer without repeatedly requesting the target printer to supply the first related value.

10. The server as in claim 8, wherein
the control device comprises a memory storing, for each of a plurality of printers, related information that is related to the printer in association with an upper value that is an upper limit of the second related value obtained by using the first related value being related to the print amount of a print executing unit of the printer,
the first related value is repeatedly obtained with the first period together with target related information from the target printer among the plurality of printers via the communication interface, the target related information being related to the target printer included in the plurality of printers; and
the second related value is repeatedly obtained with the second period together with the target related information from the target printer via the communication interface,
wherein each of the first threshold and the second threshold is obtained by using a target upper value associated with the obtained target related information in the memory.

11. The non-transitory computer-readable medium as in claim 1, wherein
the first comparison process is a process of determining whether the second related value is larger than the first threshold,
the second comparison process is a process of determining whether the second related value is larger than the second threshold,
the first threshold is a value less than an upper value that is an upper limit of the second related value, and
the second threshold is a value less than the upper value and larger than the first threshold.

12. The non-transitory computer-readable medium as in claim 1, wherein
the first related value is the number of print media that have been printed by the print executing unit, and
the second related value is identical to the first related value.

13. The non-transitory computer-readable medium as in claim 1, wherein
the first related value is the number of cartridges that have been used by the print executing unit, and
the second related value is identical to the first related value.

14. The non-transitory computer-readable medium as in claim 1, wherein
the second related value is a charge that is obtained by using the first related value and is charged according to the print amount.

15. The non-transitory computer-readable medium as in claim 14, wherein
a plurality of the first related values is obtained with the first period,
the plurality of the first related values corresponds to plural types of print that the print executing unit is capable of executing,
the plurality of the first related values is obtained with the second period, and
the second related value is the charge obtained by using the plurality of the first related values.

16. The non-transitory computer-readable medium as in claim 1, wherein
the computer-readable instructions, when executed by the processor, further cause the control device to:
determine whether an absolute value of variation of the first related value within the latest first period is larger than a predetermined value in the case where it is determined in the first comparison process that the print amount being related to the second related value is larger than the print amount being related to the first threshold;
repeatedly obtain the first related value with a third period being shorter than the second period in a case where it is determined that the absolute value of the variation is larger than the predetermined value; and
every time the first related value is obtained with the third period, execute the second comparison process,
wherein the first related value is obtained with the second period in a case where it is determined that the absolute value of the variation is less than or equal to the predetermined value.

17. The non-transitory computer-readable medium as in claim 1, wherein
the control device is included in a server,
the control device is connected to a communication interface of the server,
the first related value is repeatedly obtained with the first period from a target printer comprising the print executing unit via the communication interface, and
the first related value is repeatedly obtained with the second period from the target printer via the communication interface.

18. The non-transitory computer-readable medium as in claim 17, wherein
the computer-readable instructions, when executed by the processor, further cause the control device to:
supply first request information to the target printer via the communication interface, the first request information being for requesting to repeatedly supply the first related value with the first period,
wherein in response to the first request information being supplied to the target printer, the first related value is repeatedly obtained with the first period from the target printer without repeatedly requesting the target printer to supply the first related value; and
supply second request information to the target printer via the communication interface in the case where it is determined in the first comparison process that the print amount being related to the second related value is larger than the print amount being related to the first threshold, the second request information being for requesting to repeatedly supply the first related value with the second period,
wherein in response to the second request information being supplied to the target printer, the first related value is repeatedly obtained with the second period from the target printer without repeatedly requesting the target printer to supply the first related value.

19. A non-transitory computer-readable medium storing computer-readable instructions for a control device,
the computer-readable instructions, when executed by a processor of the control device, causing the control device to:
repeatedly obtain a first related value with a first period, the first related value being related to print amount of a print executing unit;
every time the first related value is obtained with the first period, execute a first comparison process of comparing a second related value being related to the print amount and a first threshold being related to the print amount the second related value being obtained by using the first related value which is obtained at this time;

repeatedly obtain the first related value with a second period being shorter than the first period in a case where it is determined in the first comparison process that the print amount being related to the second related value is larger than the print amount being related to the first threshold, wherein the first related value is not obtained with the second period in a case where it is determined in the first comparison process that the print amount being related to the second related value is less than or equal to the print amount being related to the first threshold;

every time the first related value is obtained with the second period, execute a second comparison process of comparing the second related value being obtained by using the first related value which is obtained at this time and a second threshold being related to the print amount, wherein the print amount being related to the second threshold is larger than the print amount being related to the first threshold; and execute a related process that is related to print executed by the print executing unit in a case where it is determined in the second comparison process that the print amount being related to the second related value is larger than the print amount related to the second threshold, wherein the related process is not executed in a case where it is determined in the second comparison process that the print amount being related to the second related value is less than or equal to the print amount being related to the second threshold.

20. A method performed by a control device, the method comprising:

repeatedly obtaining a first related value with a first period, the first related value being related to print amount of a print executing unit;

every time the first related value is obtained with the first period, executing a first comparison process of comparing a second related value being related to the print amount and a first threshold being related to the print amount, the second related value obtained by using the first related value which is obtained at this time;

repeatedly obtaining the first related value with a second period being shorter than the first period in a case where it is determined in the first comparison process that the print amount being related to the second related value is larger than the print amount being related to the first threshold, wherein the first related value is not obtained with the second period in a case where it is determined in the first comparison process that the print amount being related to the second related value is less than or equal to the print amount being related to the first threshold;

every time the first related value is obtained with the second period, executing a second comparison process of comparing the second related value being obtained by using the first related value which is obtained at this time and a second threshold being related to the print amount, wherein the print amount being related to the second threshold is larger than the print amount being related to the first threshold; and executing a related process that is related to print executed by the print executing unit in a case where it is determined in the second comparison process that the print amount being related to the second related value is larger than the print amount being related to the second threshold, wherein the related process is not executed in a case where it is determined in the second comparison process that the print amount being related to the second related value is less than or equal to the print amount being related to the second threshold.

* * * * *